United States Patent [19]
Mott

[11] 3,847,524
[45] Nov. 12, 1974

[54] SPINNERETTE HEAD ASSEMBLY WITH POROUS METAL FILTER AND SHEAR ELEMENT

[76] Inventor: Lambert H. Mott, 15 Poplar Hill Dr., Farmington, Conn. 06032

[22] Filed: Feb. 1, 1973

[21] Appl. No.: 328,884

Related U.S. Application Data

[63] Continuation-in-part of Ser. No. 183,450, Sept. 24, 1971, abandoned.

[52] U.S. Cl. ................................ 425/198, 425/199
[51] Int. Cl. ............................................. D01d 3/00
[58] Field of Search .................... 425/197, 198, 199; 264/176 F

[56] References Cited
UNITED STATES PATENTS

| | | | |
|---|---|---|---|
| 3,480,706 | 11/1969 | Carpenter et al. | 264/176 F |
| 3,570,059 | 3/1971 | Mott | 425/198 X |
| 3,634,576 | 1/1972 | Stuchlik | 425/199 X |

Primary Examiner—Robert D. Baldwin
Attorney, Agent, or Firm—Peter L. Tailer

[57] ABSTRACT

A spinnerette head assembly for extrusion of synthetic polymer fibers has a porous extended area filter with porous metal tubular elements extending therefrom to provide a large filtration area. Downstream from the filter or extending within each tubular filter element is a porous metal shear element which provides a desired pressure drop or shear in the liquid polymer passing through the spinnerette head. A shear element must have a larger pore size than the filter so that the shear element will not perform any filtration function. In addition, a shear element must provide a pressure drop or shear at least as great as that provided by the filter upstream of the shear element. If the shear element is a shear disk placed downstream from the filter, constrictors may be placed within or below the tubular elements of the filter to reduce the area of flow into the shear disk and thus provide increased shear.

12 Claims, 12 Drawing Figures

INVENTOR:
LAMBERT H. MOTT

INVENTOR:
LAMBERT H. MOTT 3,847,524

SPINNERETTE HEAD ASSEMBLY WITH POROUS METAL FILTER AND SHEAR ELEMENT

CROSS REFERENCES TO RELATED APPLICATIONS

This application is a continuation-in-part of my patent application Ser. No. 183,450 filed Sept. 24, 1971 now abandoned.

BACKGROUND OF THE INVENTION

A conventional spinnerette head assembly for the extrusion of synthetic polymer fibers contains a large central cavity into which plastic material is forced at extrusion pressures. A spinnerette disk is fixed to the spinnerette head assembly and contains small extrusion orifices through which individual polymer strands are extruded to be subsequently drawn and twisted. A filter is placed in the cavity in front of the spinnerette disk to filter foreign particles from the plastic and prevent clogging of the extrusion apertures.

A given pressure drop or shear results from a given melt passing through the extrusion orifices. This cannot be altered. The filter is conventionally relied upon to provide most of the balance of the total required shear to extrude a given material. The shear, which is not completely understood, is imparted to the synthetic polymer to homogenize it and texturize it so that extruded strands will not fracture when subsequently stretched in the draw-twist operation. Heretofore, the spinnerette filter means used has been relied upon to provide both filtration and required shear. This invention separates the filtration and the shear function so that both factors may be independently controlled.

SUMMARY OF THE INVENTION

An extended area filter having tubular or other projecting elements to increase the filter area has many advantages in its function of filtration. The larger filter area allows the filter to function for a longer period of time before clogging requires its cleaning. However, for a given porous filter material, a larger filter area reduces the pressure drop and the shear resulting in the polymer passing through it. This invention provides a shear element after the filter and before the extrusion apertures to provide any required degree of shear for a particular polymer for given extrusion conditions. To be significant, the pressure drop through the shear element should at least equal that through the extended area filter. Another requirement for the shear element is that it passes a larger particle size than does the filter so that the shear element performs substantially no filtering function. This is required as the area of the flow path into the shear element is much less than that through the filter. Thus any filtration function of the shear element would cause it to rapidly clog.

The shear element is preferrably a porous disk placed directly up stream from the spinnerette disk. It has been found that a shear control element best conditions a synthetic polymer directly before its extrusion through a spinnerette disk. The shear element may also take the form of porous plugs inserted into the lower open ends of tubular filter elements of an extended area filter. By separating the functions of filtration and shear in a spinnerette head assembly, this invention allows a spinnerette head to function many times longer than was heretofore possible before cleaning when used with synthetic polymers which require a high shear to condition them.

DESCRIPTION OF THE PREFERRED EMBODIMENTS

Figure 1:
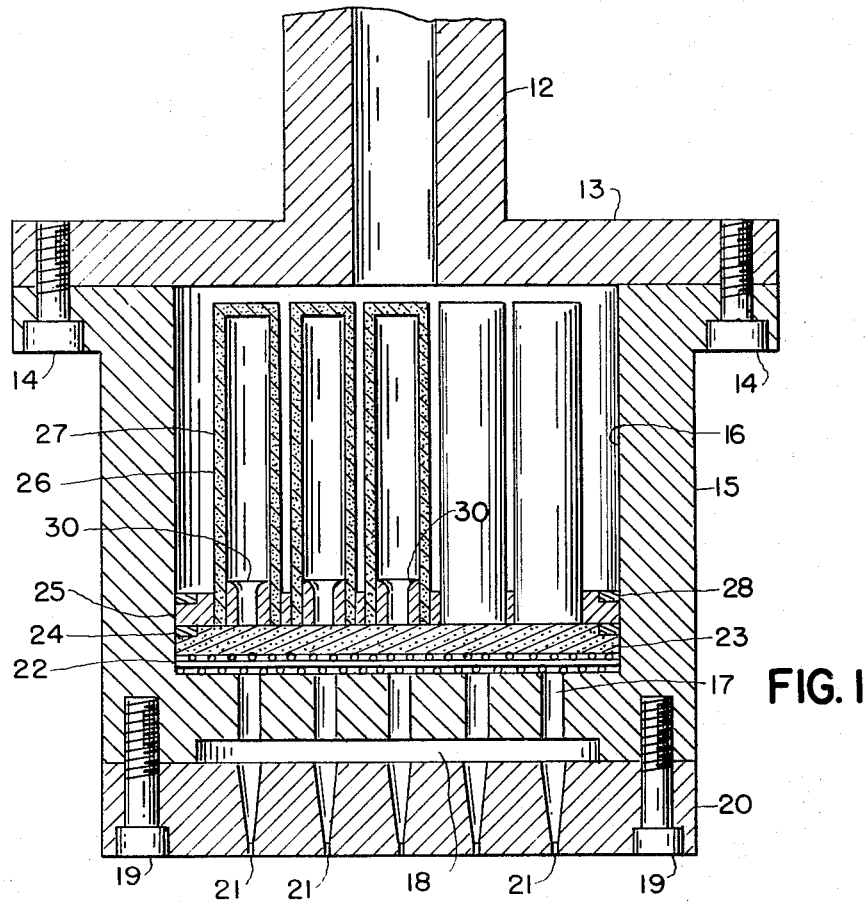
FIG. 1 is a longitudinal, vertical section through a spinnerette head assembly, the spinnerette head assembly containing an extended area filter disposed in front of a shear disk, the tubes of the filter containing constrictors to increase shear.

As shown in FIG. 1, a spinnerette head assembly has an inlet head 12 into which a synthetic polymer is introduced at a required extrusion pressure and temperature. Head 12 has a flange 13 to which bolts 14 secure the filter cup 15 containing a central cavity 16. From the bottom of cup 15 passages 17 lead to recess 18. Bolts 19 secure the spinnerette disk 20 below recess 18. Disk 20 contains the extrusion apertures 21.

A diffuser screen 22 is placed over passages 17. Shear disk 23 rests on screen 22 and contains an annular shoulder to receive a suitable seal 24. Base plate 25 of an extended area filter 26 rests on shear disk 23 and contains apertures to receive the porous tubular filter elements 27. Plate 25 contains an annular shoulder to receive a seal 28. Constrictors 30, which are short tubular elements, are pressed into the lower exit ends of the tubular filter elements 27. The constrictors 30 rest against shear disk 23.

Shear disk 23 must have a lesser degree of filtration and thus pass larger particles than the filter 26. This allows a filter 26 to be selected to provide optimum filtration characteristics as to particle size filtered and maximum filter area. A shear disk 23 is then selected to provide shear at least equal to that of filter 26 so that the shear or pressure drop through the entire assembly is at an optimum desired value.

Figure 2:
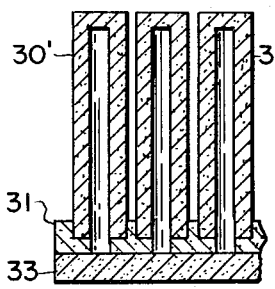
FIG. 2 is a longitudinal section through a fragment of an extended area filter having porous tubes set in a porous base plate, the filter having a shear disk disposed below its base plate.
Figure 3:
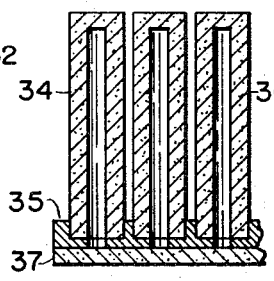
FIG. 3 is a longitudinal section through a fragment of an extended area filter having porous tubes set in a solid base plate, the filter having a shear disk disposed below its base plate.
Figure 4:
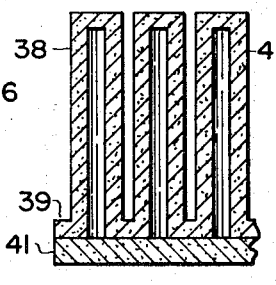
FIG. 4 is a longitudinal section through a fragment of an extended area filter having integrally formed tubes and a base plate with a shear disk disposed below its base plate.

FIG. 2 shows an extended area filter 30' having a porous base plate 31 and porous tubular filter elements 32 disposed against a porous shear plate 33. As shown in FIG. 3, an extended area filter 34 has an impermeable base plate 35 and tubular filter elements 36 disposed over a porous shear plate 37. As shown in FIG. 4, an extended area filter 38 has an integrally formed base plate 39 and tubular filter elements 40 disposed over a shear plate 41. If the assemblies of elements shown in FIGS. 2-4 do not provide sufficient shear, solid constrictors 30, as shown in FIG. 1, are inserted or pressed into the tubular filter elements of an extended area filter. The constrictors reduce the area of flow entering the shear disk to provide increased shear when required. Since flow is isotropic in a porous shear disk, the shear disk performs a secondary function of distributing flow passing therethrough as the flow exits more evenly than it enters.

Figure 9:
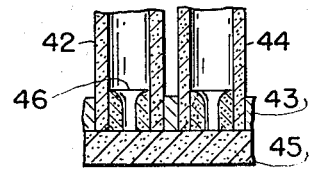
FIG. 9 is a longitudinal section through a fragment of an extended area filter having porous tubular elements pressed in a solid base plate and having a shear disk disposed therebelow, the tubular elements having porous constrictors pressed therein.

FIG. 9 shows an extended area filter 42 having an impermeable base plate 43 into which the tubular porous metal filter elements 44 are pressed. Filter 42 has a shear disk 45 disposed below it. Porous metal constrictors 46 are used to increase shear. A main advantage of porous metal constrictors 46 is that they are inexpensive to fabricate.

Figure 10:
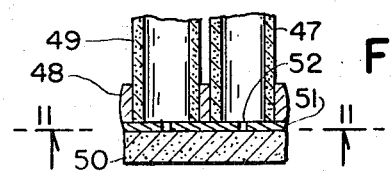
FIG. 10 is a longitudinal section through a fragment of an extended area filter with a shear disk disposed below it and with a perforated plate disposed between the filter and the disk to increase shear.
Figure 11:
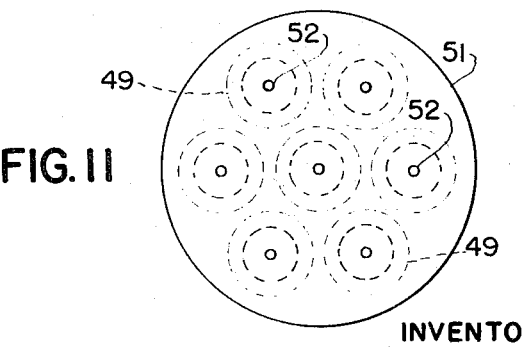
FIG. 11 is a section taken on line 11—11 of FIG. 10.

FIG. 10 shows an extended area filter 47 having an impermeable base plate 48 and tubular filter elements 49 pressed therein. Between filter 47 and shear disk 50 there is a plate 51 containing small apertures 52 below the tubular filter elements 49. The apertures or perforations 52 reduce the area of flow into shear disk 50 to increase shear.

Figure 5:
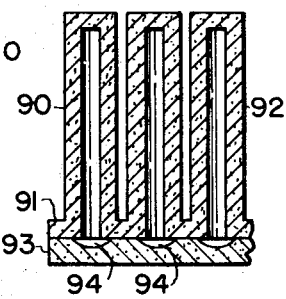
FIG. 5 is a longitudinal section through a fragment of an integrally formed extended area filter disposed over a shear disk, the shear disk having hollowed out depressions under the filter tubes to increase the area of entry into the shear disk.

As shown in FIG. 5, an integrally formed extended area filter 90 has tubular filter elements 92 and a base plate 91 disposed on a shear disk 93 containing the depressions 94 below each tubular filter element 92. The depressions 94 increase the area of flow into the shear disk 93 to reduce shear when desired in a given application.

Figure 6:
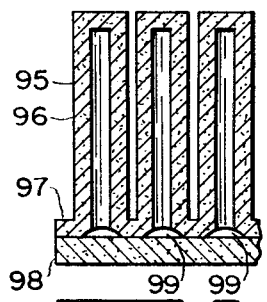
FIG. 6 is a longitudinal section through a fragment of an integrally formed extended area filter disposed over a shear disk, the bottom surface of the filter containing cavities under the filter tubes to increase the area of entry into the shear disk.

As shown in FIG. 6, the same result is obtained when an integrally formed extended area filter 94 having tubular filter elements 96 and a base plate 97 is disposed on a shear disk 98. Cavities 99 formed in the bottom surface of base plate 97 reduce shear by increasing the area of flow into shear disk 98.

Figure 8:
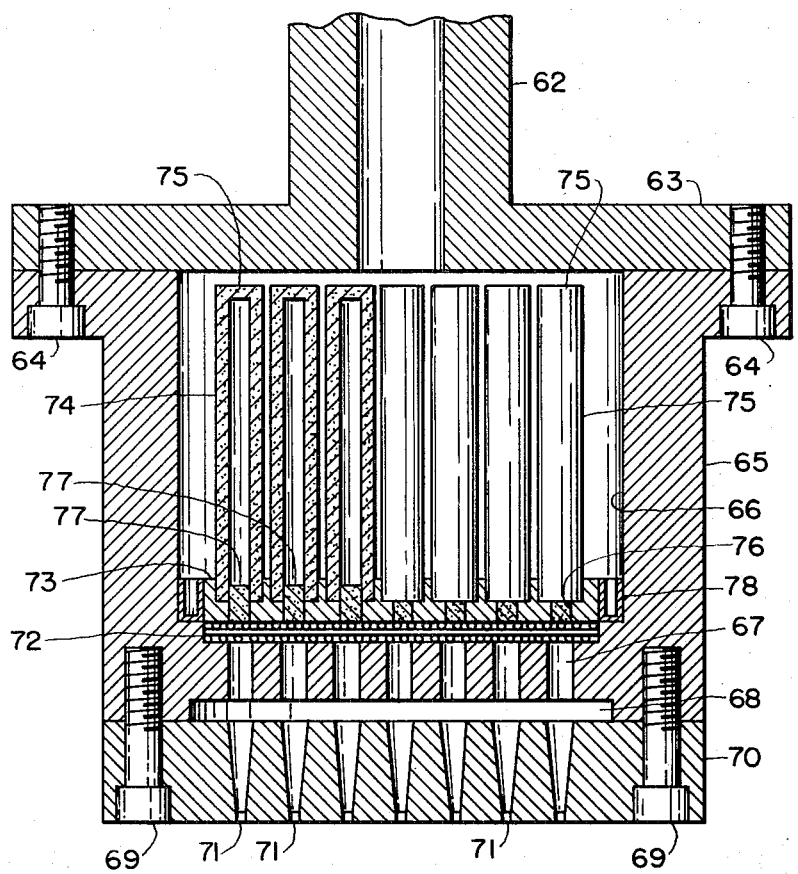
FIG. 8 is a longitudinal, vertical section through a spinnerette head assembly containing an extended area filter and having shear elements inserted as plugs into the tubular elements of the filter.

As shown in FIG. 8, a spinnerette head assembly has an inlet head 62 having a flange 63 to which there is secured by bolts 64 a filter cup 65 containing a central cavity 66. From the bottom of cup 65 passages 67 lead to recess 68. Bolts 69 secure the spinnerette disk 70 containing the extrusion apertures 71 in place.

A diffuser screen 72 has the base plate 73 of an extended area filter 74 rest on it. A seal 78 is disposed about base plate 73 to form a seal between it and cup 65. Porous metal tubular filter elements 75 are pressed into base plate 73 which contains passages 76 leading to the interior of the elements 75. Shear plugs 77 are pressed into the ends of the tubular filter elements 75. Since the shear elements or shear plugs 77 rest on diffuser screen 72, the high extrusion pressures cannot dislodge them.

Figure 7:
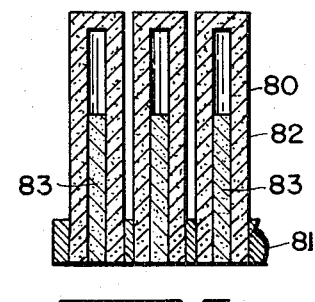
FIG. 7 is a longitudinal section through a fragment of an extended area filter having porous tubes set in a solid base plate, the filter having shear elements in the form of porous plugs extending into its tubular elements.

As shown in FIG. 7, an extended area filter 80 has a base plate 81 into which is pressed the tubular filter elements 82. Shear plugs 83 may be pressed into the tubular filter elements to extend well up into them and still be effective.

Shear is related to pressure drop through the entire spinnerette head assembly. Referring to FIG. 1, there is some shear resulting from passage of the melt through each of the following: the extended area filter 26, the shear disk 23, the diffuser screen 22, the passages 17, recess 18, and the extrusion apertures 21. However, shear mainly results from passage of the viscous synthetic polymer at high extrusion pressures through the extended area filter 26, shear disk 23, and the extrusion apertures 21. For some synthetic polymers under given extrusion conditions the shear resulting from passage through the filter 26 and the extrusion apertures 21 will be sufficient to condition them so that no shear element is required.

Among synthetic polymers that require high shear are Dupont 66, Nylon 6, Nylon 66, polyesters and polypropylenes. Thus some synthetic polymers require higher shear to condition them than can result from passage through an extended area filter and the extrusion apertures 21. As an example of this invention, a given extended area filter 26 filtering 10 micron particles with a flow rate of 10 ml. per minute/per square inch provided a pressure drop of 600 p.s.i. to provide shear. A shear disk 23 filtering 70 microns placed beneath it provided a pressure drop of 776 p.s.i.; a shear disk filtering 50 microns provided a pressure drop of 1,125 p.s.i.; a sheat disk filtering 30 microns provided a pressure drop of 1,550 p.s.i.; a shear disk filtering 20 microns provided a pressure drop of 2,050 p.s.i.; and a shear disk filtering 15 microns provided a pressure drop of 2,500 p.s.i. In this example, the tubular filter elements 27 and the shear disk 23 were of porous stainless steel of a porosity of about 50 per cent. In all cases, a shear disk must provide at least as much additional shear or pressure drop as the upstream filter.

Reducing the porosity or increasing the density of a shear disk of a given degree of filtration increases the pressure drop or shear for a given flow therethrough.

Constrictors 30 or a perforated plate 51 also serve to increase shear by reducing the area of the flow into a shear disk. In some applications, constrictors 30 are required to get a desired shear. Thus, this invention allows shear to be adjusted to any desired value in a spinnerette head assembly using an extended area filter for maximum effective filtration. While porous metal filter elements and shear disks have been described, other porous materials could be used.

Figure 12:
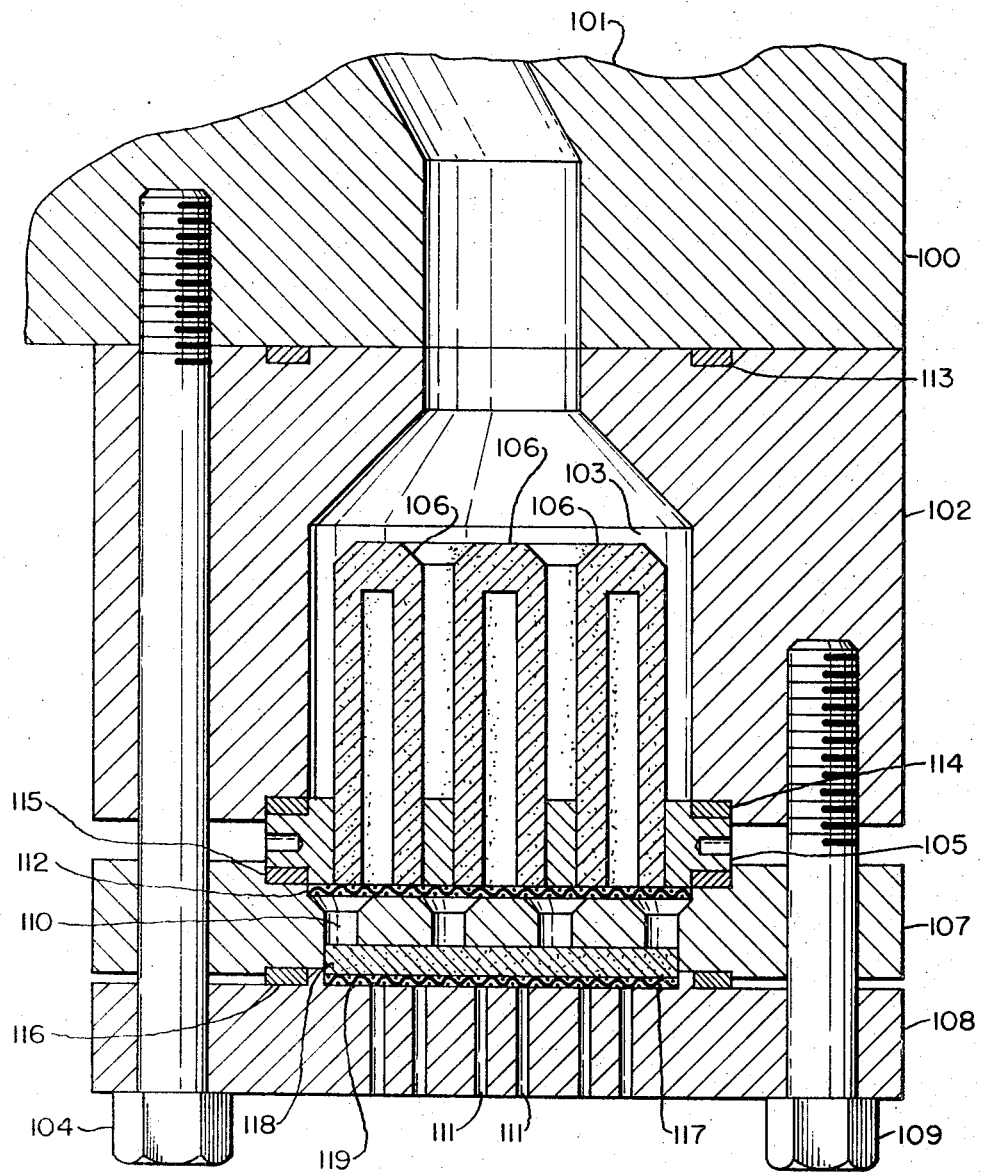
FIG. 12 is a longitudinal, vertical section through a spinnerette head assembly having a shear control element mounted therein according to a preferred embodiment of this invention.

A preferred embodiment of this invention is shown in FIG. 12. A spinnerette head 100 has an inlet head 101 to which is fixed the cup 102 containing the central cavity 103. An extended area filter base 105 is fixed at the bottom of cup 102. Base 105 has porous tubular filter elements 106 extend upward therefrom to occupy the cavity 103.

Base 105 has a breaker plate 107 and an extrusion disk 108 fixed below it by means of the bolts 109. Bolts 104 fix these elements and also fix cup 102 to inlet head 101. Plate 107 contains the passages 110 and disk 108 contains the fine extrusion apertures 111. Screen 112 rests under base 105. Seals 113, 114, 115 and 116 seal the fixed elements.

A cavity 117 is provided in the bottom of plate 107 to receive a shear compensating disk 118 which rests on screen 119 to allow molten polymer to flow to the extrusion apertures 111. Shear compensating disk 118 has a larger pore size than the filter elements 106, but it has a low enough porosity so that it provides at least as much pressure drop through it as do the filter elements 106.

Although shear is not completely understood, it has been found that better results are obtained in providing shear and conditioning the synthetic polymer for extrusion if the shear compensating disk 118 is placed as close upstream as possible from the extrusion apertures 111. The shear provided should at least equal that of the filter upstream from it.

While the term shear disk has been used, in some applications the central cavity is not cylindrical as shown and the shear disk is not round but conforms to the central cavity. Thus the term shear disk includes other shapes than circles.

What is claimed is:

1. In a spinnerette head assembly for the extrusion of synthetic polymer fibers, said assembly having a filter cup containing a central cavity, and a spinnerette disk containing extrusion apertures, said filter cup having passages leading to the extrusion apertures of said spinnerette disk; filter and shear elements comprising, in combination, an extended area porous metal filter extending into said central cavity having a filter area greater than the cross-sectional area of said cavity, and a porous metal shear element downstream from said filter filtering larger particle sizes than said filter, said shear element providing controlled pressure drop in flow therethrough at least equal to that resulting in flow through said extended area filter.

2. The combination according to claim 1 wherein said extended area filter has a base plate and tubular filter elements of porous metal having open ends fixed in said base plate, said tubular filter elements extending upward from said base plate.

3. The combination according to claim 2 wherein said shear control element comprises porous plugs inserted into the open ends of said tubular filter elements.

4. The combination according to claim 2 wherein said shear control element comprises a shear disk disposed below said base plate of said extended area filter.

5. The combination according to claim 4 with the addition of tubular restrictors inserted into the open ends of said tubular filter elements, said restrictors reducing the area of flow entering said shear disk to increase shear.

6. The combination according to claim 4 with the addition of a perforated plate between said base plate and said shear disk, said plate containing apertures below said tubular filter elements reducing the area of flow entering said shear disk to increase shear.

7. The combination according to claim 4 wherein said shear disk contains depressions below said tubular filter elements increasing the area of flow entering said shear disk to reduce shear.

8. The combination according to claim 4 wherein said base plate has a bottom surface containing cavities about each filter tube element increasing the area of flow entering said shear disk to reduce shear.

9. The combination according to claim 1 wherein said shear element is directly upstream from said spinnerette disk.

10. The combination according to claim 9 with the addition of a diffuser screen, said shear control element resting against said spinerette disk with said diffuser screen therebetween.

11. The combination according to claim 1 wherein said spinnerette head assembly has a breaker plate fixed below said extended area filter and said spinnerette disk is fixed below said breaker plate, said breaker plate containing said passages leading to the extrusion apertures of said spinnerette disk and said breaker plate containing a cavity adjacent to said spinnerette disk, said shear element being disposed in said cavity of said breaker plate directly above said spinnerette disk.

12. The combination according to claim 11 with the addition of a diffuser screen disposed between said spinnerette disk and said shear control element.

* * * * *